United States Patent [19]

Brooks

[11] Patent Number: 4,857,896
[45] Date of Patent: Aug. 15, 1989

[54] POLYPHASE CIRCUIT FUSE CONDITION INDICATING DEVICE

[75] Inventor: Stanley J. Brooks, Palm Harbor, Fla.

[73] Assignee: Square D Company, Palatine, Ill.

[21] Appl. No.: 110,117

[22] Filed: Oct. 19, 1987

[51] Int. Cl.$^4$ .......................................... G08B 21/00
[52] U.S. Cl. .................................. 340/639; 324/550; 337/146
[58] Field of Search ................ 324/550, 537; 340/639, 340/638; 337/7, 146

[56] References Cited

U.S. PATENT DOCUMENTS

| | | | |
|---|---|---|---|
| 2,317,030 | 4/1943 | Colvin | 340/639 |
| 2,355,149 | 8/1944 | DeGiers | 340/815.13 |
| 2,471,848 | 5/1949 | Von Hoorn | 340/638 |
| 2,610,237 | 9/1952 | Benner | 324/537 |
| 2,774,960 | 12/1956 | Podell | 340/639 |
| 2,882,521 | 4/1959 | Salzer | 340/639 |
| 2,929,961 | 3/1960 | Croco | 340/815.13 |
| 3,284,598 | 11/1966 | George | 337/211 |
| 3,339,119 | 8/1967 | Stanback | 439/830 |
| 3,354,277 | 11/1967 | Stanback | 337/205 |
| 3,379,842 | 4/1968 | Downs | 337/146 |
| 3,546,692 | 12/1970 | Salzer | 340/639 |
| 4,281,322 | 7/1981 | Nasu | 340/639 |
| 4,691,197 | 9/1987 | Damiano | 340/639 |

FOREIGN PATENT DOCUMENTS

| | | | |
|---|---|---|---|
| 2724358 | 11/1978 | Fed. Rep. of Germany . | |
| 2373146 | 8/1978 | France | 337/7 |
| 729689 | 5/1980 | U.S.S.R. . | |

OTHER PUBLICATIONS

N. Ruiz; Practical Electronics; Jul. 1976; IPC Magazines Ltd., London, England.
Commercial Literature; Eaton Corporation-Apr. 1985, May 1985.

Primary Examiner—Joseph A. Orsino
Assistant Examiner—Jill D. Jackson
Attorney, Agent, or Firm—A. Sidney Johnston; J. W. Jimenez

[57] ABSTRACT

A polyphase circuit fuse condition indicating device includes three substantially identical circuits forming a Y-connection across each fuse through first and second leads. Each circuit has an indicator light and a switch with resistors in the leads. The respective circuits are interconnected through a lead having a resistance for each circuit so that an indication will be rendered without a load across the fuse.

16 Claims, 2 Drawing Sheets

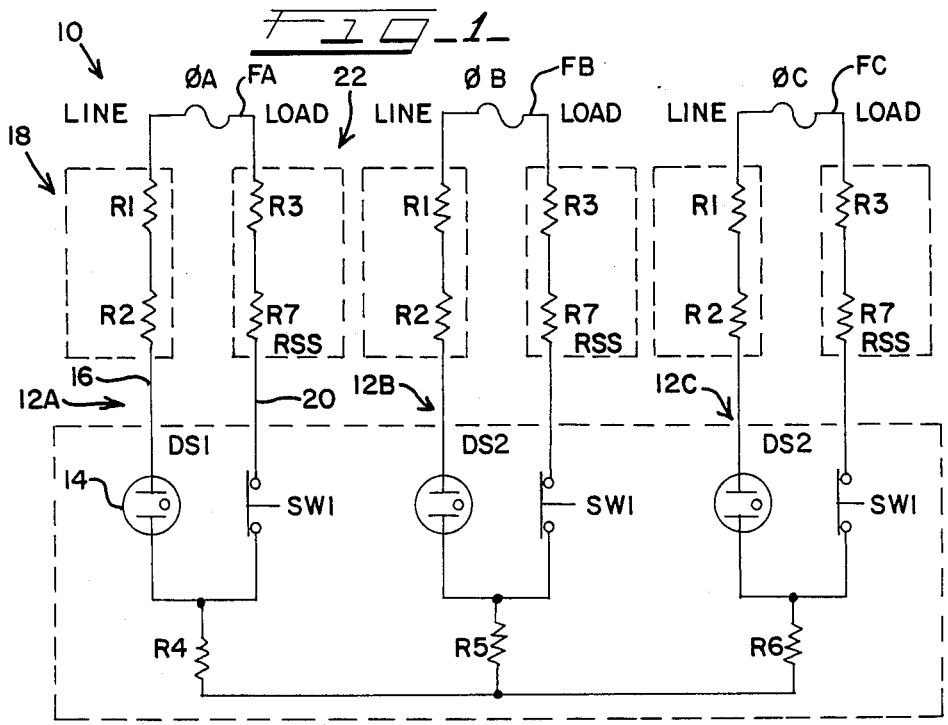
FIG-1
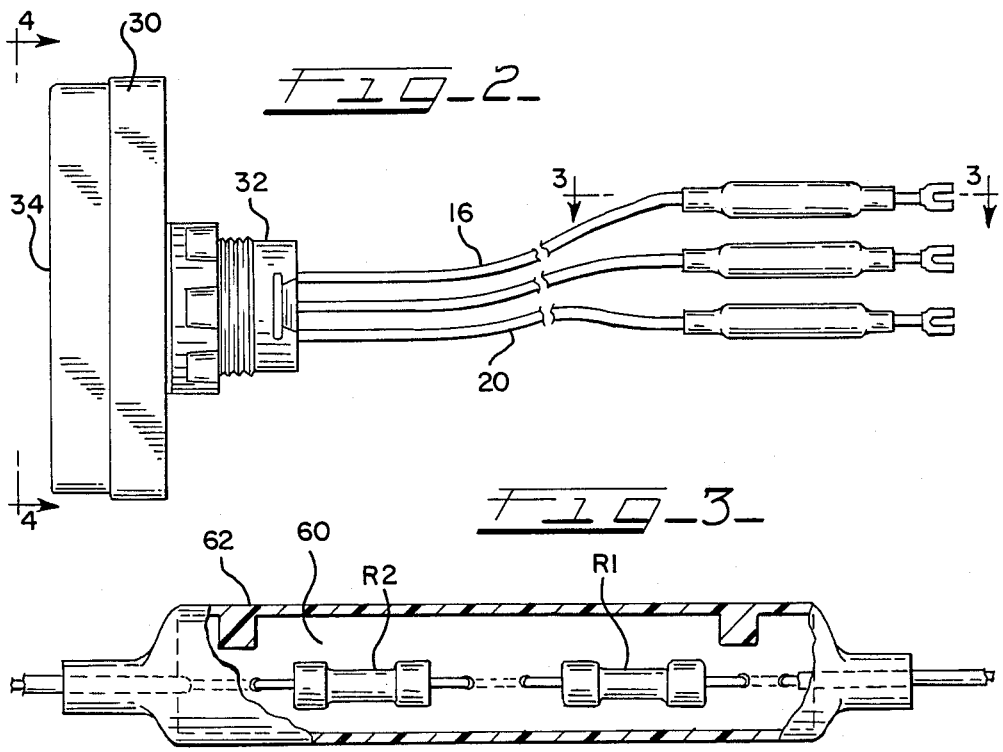
FIG-2
FIG-3

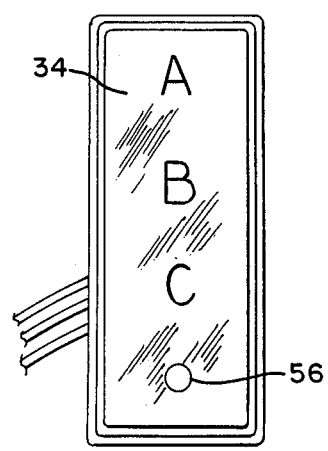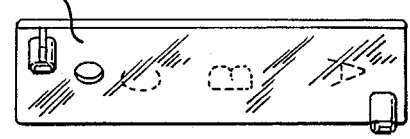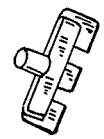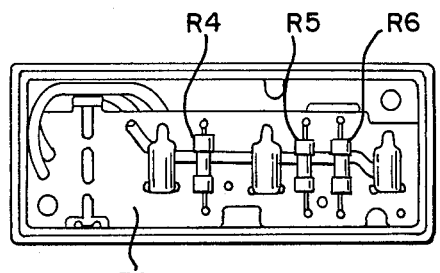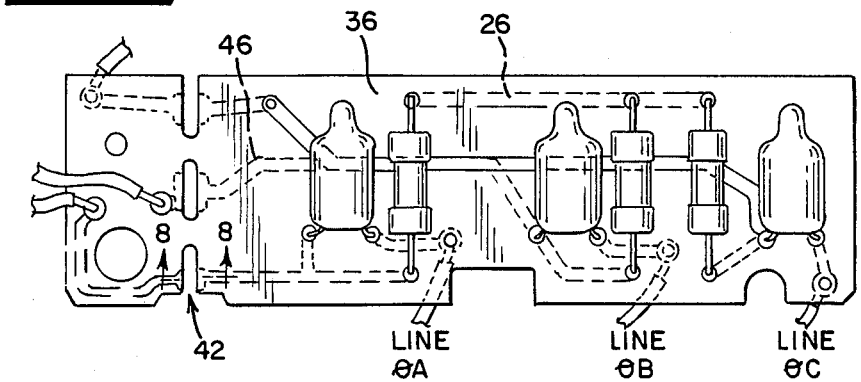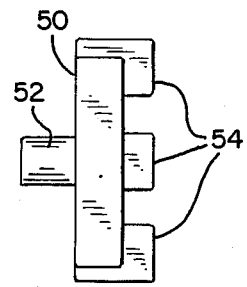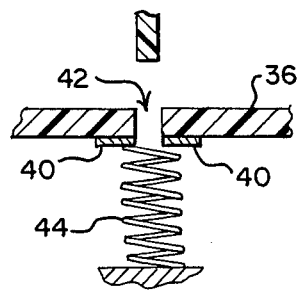

POLYPHASE CIRCUIT FUSE CONDITION INDICATING DEVICE

DESCRIPTION

1. Technical Field

The present invention relates to fuse indicator devices and more particularly to devices for indicating the condition of fuses in a polyphase electric circuit.

2. Background Art

There is a need for indicating the condition—blown or still good—of fuses protecting a polyphase electrical circuit, such as is used to power industrial equipment. The fuse condition indicators have been developed to be mounted on the front of the fuse-containing cabinet so that an activated lamp indicates the blown fuse. This aids service personnel in locating the problem area quickly to return the equipment to service. Typically, these devices have pairs of leads extending from a housing to be connected to the opposite sides of a cartridge fuse holder. When the fuse blows, an associated neon lamp in the housing becomes lit.

These devices also provide a single push-button switch arrangement for testing the circuit of the fuse condition indicator device, while the line is present, from the line side of the fuse to the indicator lamp. Service personnel can test the operation of the indicator lamps by depressing the push-button switch while the line is present; a properly operating circuit will light the three lamps. This also avoids opening the cabinet and inserting a test probe to determine whether the line power is present at tee fuse.

The leads extending from the housing also have included axial resistors connected in series, without any supports, for reducing the voltages appearing in the housing and to limit currents that can flow through the components in the housing. Mounting the resistors without supports results in undesired tensile strain in the leads of the axial resistor.

More particularly, the prior devices include circuits in the housing that present a loop extending between the pairs of leads for each phase. Each loop connects to the loops for the other phases at two points spaced from one another. From the line side, the loop includes in series, a first rectifier diode with the cathode connected to the lead, a series connected thyristor, a neon lamp, a first resistance and a second rectifier diode whose cathode is connected to the extending lead. A second resistance connects across the loop at the anodes of the two rectifier diodes and the gate control lead of the thyristor connects to between the first series resistance and the anode of the second rectifier diode. The connection between the circuit loops of each phase occur at the cathode of the first rectifier diode and between the neon lamp and series resistance.

This results in applying a direct current to the neon lamps by way of the rectifier diodes rectifying the AC power received from the line. Applying DC to the neon lamp causes sputtering within the neon bulb and shortened life. Further, this circuit arrangement uses many parts and expensive thyristors.

It would be beneficial to obtain a fuse condition indicator having a small parts count and that applies AC to the neon bulb. Such a device would be less expensive than the known device while obtaining lower manufacturing costs and like operation.

SUMMARY OF THE INVENTION

According to the present invention, an indicating device for indicating the condition of fuses in a polyphase electric circuit includes parallel identical circuits, each having indicator means for producing user recognizable indications of the condition of a corresponding fuse. The indicator means have first and second leads extending from opposite sides thereof with first and second resistor means in the respective leads and switch means in one of the leads between the resistor means and the indicator means. In addition, the respective circuits are interconnected through a single connection connected into the circuit between the indicator means and the switch means with a resistance for each of the indicator means so that the indicating means is activated regardless of the presence of a load at the corresponding fuse.

According to a further aspect of the present invention, the fuse condition indicating device is embodied in a housing that can readily be installed into a control panel without any modification thereof and essentially forms a Y-connection with opposite sides of the fuse. More specifically, the housing has a collar integral with a rear wall and a translucent front wall with the indicator means mounted on a board supported in the housing. The board also supports the resistors and the interconnection between the respective circuits as well as the switch means.

The switch means in the respective circuits each include a pair of contacts located on opposite sides of a slot with a conductive spring means in the housing and normally bridging the contacts. An actuator in the form a non-conductive member has prongs received into the slots so that application of a force on the actuator will simultaneously open all of the switches to test the indicator lights.

BRIEF DESCRIPTION OF DRAWINGS

FIG. 1 is a circuit diagram of the present invention;

FIG. 2 is a side view of the indicating device of the invention;

FIG. 3 is a cross-sectional view as viewed along line 3—3 of FIG. 2;

FIG. 4 is a front view of the housing of the device, as viewed along line 4—4 of FIG. 2;

FIG. 5 is an exploded view of the housing;

FIG. 6 is a plan view of the circuit board in the housing;

FIG. 7 is a side view of the switch actuator; and,

FIG. 8 is a fragmentary cross-section, as viewed along line 8—8 of FIG. 6.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

FIG. 1 of the drawings shows an electric circuit embodying the invention. The circuit of the present invention is generally designated by reference numeral 10 and includes three identical circuits 12A, 12B and 12C respectively connected to the line and load side of three fuses FA, FB and FC, respectively connected in series with the three phases A, B and C of a polyphase circuit.

Each circuit 12 consists of an indicator means 14 in the form of a neon light which is connected through a lead 16 to the line side of the fuse FA. The lead 16 includes series connected first resistor means 18 consisting of resistors R1 and R2, which will be described in more detail later. The circuit 12 also includes a second lead 20 that includes series connected resistor means 22 in the form of series resistors R3 and R7. These also will be described in more detail presently. Line 20 also has a switch SW1 connected in series between resistance means 22 and neon lamp 14. The respective identical circuits 12 are interconnected by a common lead 26 through resistors R4, R5 and R6 respectively connected between the indicator means 14 and the switch SW1 in the leads extending to the respective circuits 12.

In operation, and with a good fuse F, the voltage drop across resistor means 22, resistors R3 and R7 is low enough to keep neon lamp 14 extinguished. When fuse F opens or blows, resistor means 22 is no longer in the circuit and the voltage across the lamp 14 increases causing it to light. The switches SW1 are in series with the resistor means 22 to cause the same effect as a blown fuse.

This obtains a fuse condition indicator with a minimal component count, with no expensive components such as thyristors and using AC to light the neon lamp 14.

According to one aspect of the invention, the fuse condition indicating device is packaged in a manner such that it can readily be installed into a conventional opening found in a control panel which houses the fuses and can be readily visible from outside the housing in viewing the control panel. Thus, as shown in FIG. 2, the packaging includes a housing 30 having a threaded collar 32 extending from a rear surface thereof intermediate upper and lower ends with the front surface 34 being formed of a non-metallic transparent, preferably colored material having the three phases A, B and C (FIG. 4) identified thereon. The indicator means 14 are respectively mounted on a printed circuit board 36 that fits in the housing 30 so that the respective lights 14 mount behind the three raised letters indicating the phases A, B and C. Also, the resistors R4, R5 and R6 mount on the board 36 and connect between the respective circuits 12 and lights 14 through soldered connections on the printed board.

According to one further aspect of the invention, the respective switches SW1 for the three phases of the circuits mount on the circuit board 36 such that they can readily all be simultaneously actuated through the use of one actuator. Thus, as illustrated in FIGS. 6, 7 and 8, each switch consists of first and second copper-clad contacts 40 that are respectively located on opposite sides of a generally rectangular slot 42 formed in the board 36. A coil spring (FIG. 8) 44 mounts between the housing and circuit board 36 to bridge the respective copper-clad contacts 40 when no external force is applied, thereby completing the circuit across the copper-clad contacts. Of course, the copper-clad contacts 40 are interconnected with the respective circuits 12 through leads 46 printed on the board 36.

The actuator for simultaneously actuating all three switches SW1 is illustrated in FIG. 7 and includes a non-conducting member 50 that has a circular center button 52 extending from one surface and has three rectangular projections or prongs 54 extending from an opposite surface and adapted to be received into the respective slots 42. The circular button 52 extends through an opening 56 in the cover 34 and thus all three switches can be simultaneously actuated by pushing a single button that is readily accessible. Depressing the button causes the three prongs to depress and move the springs 44 out of engagement with the contacts 40, opening the switches SW1.

According to one further aspect of the invention, all of the respective resistor means 18 and 22 for each of the circuits 12 are mounted on boards such that the leads of the resistors are not subjected to any tensile forces when pulling forces are applied to the leads. Thus, as illustrated in FIG. 3, each lead 16 includes a support board 60 which supports the respective resistors, such as resistors R1 and R2, and the leads of the respective resistors are connected to lead 16 through soldered connections on the board. The board is then encapsulated with a heat shrinkable material 62 so that the resistors and connections are externally sealed by the non-conductive heat shrink material. The encapsulation also includes a rubber strip to prevent the solder connections from piercing the heat-shrunk material.

The indicating circuit is designed to be utilized with circuits of varying voltage and the following chart is exemplary of the resistances that are utilized for different voltage sources:

| Ref. Design. | 240 Vac. | 480 Vac. | 600 Vac. |
| --- | --- | --- | --- |
| R1 | 82K | 200K | 240K |
| R2 | 82K | 200K | 240K |
| R3 | 15K | 30K | 36K |
| R4 | 82K | 270K | 390K |
| R5 | 82K | 270K | 390K |
| R6 | 82K | 270K | 390K |
| R7 | 15K | 30K | 36K |

With these values, the resistance of the first resistance means 18 is substantially greater than the resistance means 22 by about five times. The resistance of the third resistance means, resistors R4, R5 and R6, in series between the circuits 12 is substantially equal to the resistance of the first resistance means 18 and is substantially greater than the resistance of the second resistor means 22 by about five times.

While the specific embodiments have been illustrated and described, numerous modifications come to mind without significantly departing from the spirit of the invention and the scope of protection is only limited by the scope of the accompanying claims. For example, the details of the resistances and other components can be varied while remaining within the scope of the claims.

I claim:

1. A fuse condition indicating device adapted to be connected to a polyphase electric circuit in which said electric circuit includes plural line leads, corresponding plural load leads and plural fuses with each fuse being connected in series between corresponding line and load leads, said device comprising:

plural indicator means, one associated with each of said phases of said polyphase electric circuit, each of said indicator means having first and second sides, and each of said indicator means for producing user recognizable indications of the condition of its corresponding fuse;

plural first resistor means, one associated with each of said phases of said polyphase electric circuit, each of said first resistor means having first and second sides, each adapted to be connected between said first side of said corresponding indicator means and one of either the line or load leads of its corresponding fuse, each of said plural first resistor means providing a substantially resistive load;

plural second resistor means, one associated with each of said phases of said polyphase electric circuit, each of said second resistor means having first and second sides, each adapted to be connected between said second side of said corresponding indicator means and the other of either the line or load leads of its corresponding fuse, each of said plural second resistor means providing a substantially resistive load;

plural third resistor means, each connected between said second side of said corresponding indicator means and said second sides of said other indicator means, each of said plural third resistor means providing a substantially resistive load between said second side of its corresponding indicator means and said second sides of said other indicator means.

2. The device of claim 1, in which the resistance of the first resistor means is substantially greater than the resistance of the second resistor means.

3. The device of claim 1, in which the resistance of the first resistor means is greater than five times the resistance of the second resistor means.

4. The device of claim 1, in which the resistance of the third resistor means between said indicator means is substantially equal to the resistance of said first resistor means.

5. The device of claim 1, in which the resistance of the third resistor means between the indicator means is substantially greater than the resistance of the second resistor means.

6. The device of claim 1, in which the resistance of the third resistor means between the indicator means is greater than five times the resistance of the second resistance means.

7. The device of claim 1 including a switch having pairs of contacts each connected between said other side of said indicator means and said second resistor means so that operating said switch opens all of said contacts to activate and test the operability of said indicator means.

8. A fuse condition indicating device adapted to be connected to a polyphase electric circuit in which said electric circuit includes plural line leads, plural corresponding load leads and plural fuses with one of said plural fuses being connected in series between each corresponding line and load leads, said device comprising:

plural indicator circuits, one associated with each of said fuses, each of said indicator circuits having indicator means for producing a visual indication of the condition of its corresponding fuse and adapted to be connected across said corresponding fuse; and, interconnection means connected to the same point in each of the plural indicator means, said interconnection means for providing a circuit path between each of said indicator means so that any one fuse becoming open activates said corresponding visual indication regardless of the presence of a load at that fuse.

9. The device of claim 8, in which said interconnection means include resistances for at least partially isolating the indicator circuits from one another.

10. A fuse condition indicating device for a polyphase electric circuit comprising a housing having a plurality of indicator lights therein equal in number to the phases in said polyphase electric circuit, a plurality of circuits, each including first and second parallel circuit means, each of said circuits connected to a corresponding one of said indicator lights and each of said first and second parallel circuits of each of said plurality of circuits having a resistor means therein with a fuse interconnecting said respective first and second circuit means, one of said first and second parallel circuits of each of said plurality of circuits being interrupted when said corresponding fuse is rendered inoperative to increase the voltage across said corresponding indicator light and energize said corresponding indicator light; and, a common connection, and a plurality of resistors, one resistor connecting each of said plurality of circuits with said common connection.

11. A fuse condition indicating device as defined in claim 10, in which each of said resistor means includes one resistor extending between said common connection and said corresponding circuit means.

12. A fuse condition indicating device as defined in claim 10, further including a plurality of switch means, one in each of either, of said corresponding first and second parallel circuit means said one of said circuit means and an actuator for simultaneously actuating all of said switch means.

13. For a polyphase circuit having a fuse for each of said circuits, a fuse condition indicating device for indicating the status of each of said fuses comprising a housing having an indicator light for each phase of said circuit, first and second leads leading from each of said indicator lights and connected to the line and load sides of their respective one of said fuses, a plurality of mutually actuated switch means in said housing, one associated with each of said circuits and connected in series with each of said first leads, each of said first leads having a first resistor external of said housing with a first board supporting said first resistor, a second resistor in each of said second leads externally of said housing with a second board supporting each of said second resistors, encapsulating means for encapsulating said boards and said resistors and a plurality of third resistors, one associated with each of said phases, each of said third resistors having first and second sides, each of said first sides coupled with said respective first leads between said respective indicator lights and switch means, and each of said second sides coupled together.

14. A fuse condition indicating device as defined in claim 13, further including interconnection means respectively connected to said second leads between said indicator lights and said second resistors, said interconnection means including resistances for each of said indicator lights.

15. A fuse condition indicating device as defined in claim 14, further including a board in said housing supporting said indicator lights and said resistances.

16. A fuse condition indicating device as defined in claim 15, in which each switch includes first and second contacts respectively positioned on opposite sides of a slot with spring means normally bridging said slots, and a common actuator received into said slots for simultaneously compressing said spring means to open said switches.

* * * * *